April 7, 1964     Q. A. HANSEN     3,127,969
MECHANICAL CLUTCH OF THE COMPACT AND SELF-CONTAINED TYPE
Filed Feb. 8, 1962
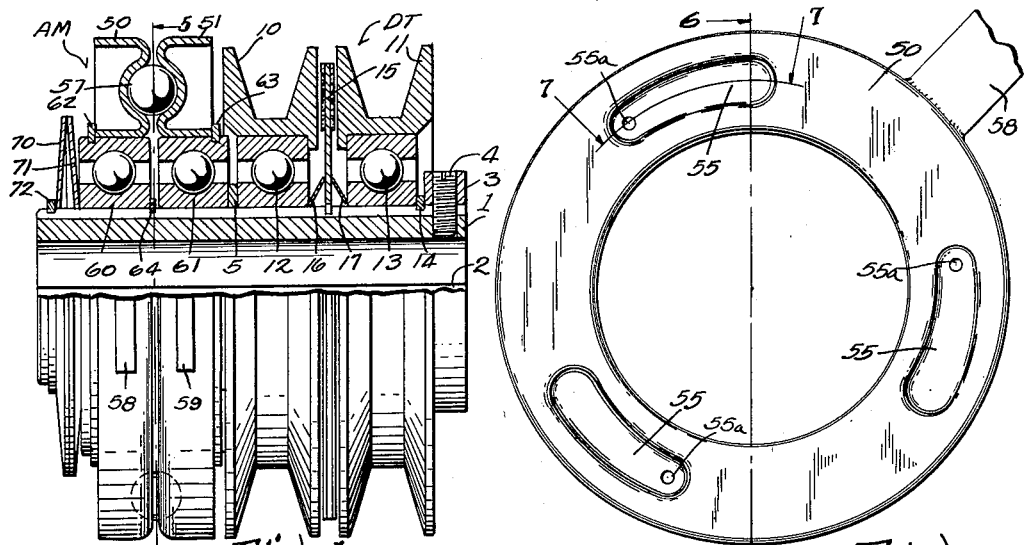
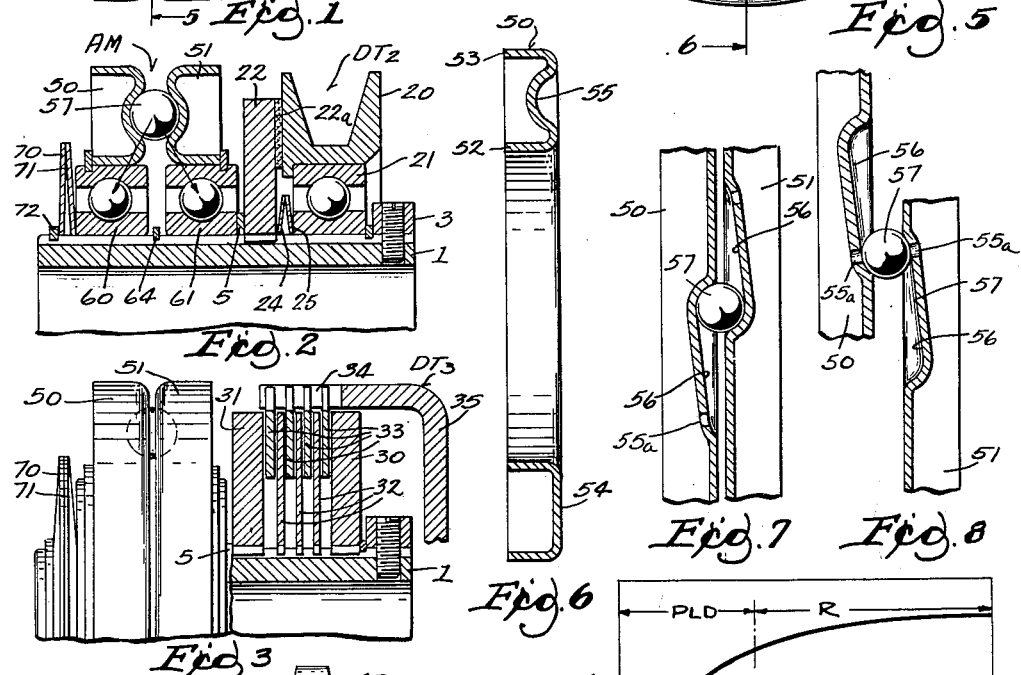
INVENTOR.
QUINTEN A. HANSEN
BY
Lieber, Lieber & Nilles
ATTORNEYS United States Patent Office 3,127,969
Patented Apr. 7, 1964

3,127,969
MECHANICAL CLUTCH OF THE COMPACT AND
SELF-CONTAINED TYPE
Quinten A. Hansen, Highway 38, Franksville, Wis.
Filed Feb. 8, 1962, Ser. No. 171,836
7 Claims. (Cl. 192—93)

The present invention relates to mechanically operated, integral clutches of the compact and self-contained type. More particularly, the clutch provided by the present invention is of the type having a pair of relatively rotatable cam members with a plurality of actuating balls therebetween which cooperate with and cause axial separation of the members, and consequently axial thrust for causing engagement of the drive transmitting members of the clutch.

One aspect of the present invention is to provide a clutch of the above general type in which the cam members are mounted in an improved manner and which results in a smoothly operating and efficient clutch of compact design, particularly in axial dimension.

Another more specific aspect of the present invention is to provide a clutch of the type mentioned immediately above and in which the cam members (1) are each mounted by an antifriction, radial thrust, ball bearing assembly on a rotatable support which forms a part of the integral clutch, (2) can be rotated slightly relative to one another but do not bodily rotate when the clutch is in operation, and (3) the bearing assemblies are so relatively mounted on the support, one being fixed against axial displacement beyond a pre-determined point relative to the other, that when the clutch is commencing to be operated, the axial operation of the cam members first acts to take up all disc clearance, and only then the Belleville springs begin to workingly compress to apply uniform axial force or a force having other known and predetermined characteristics.

A shortcoming of prior art clutches of this general type is that even though they have special adjusting means to compensate for wear of the friction surfaces, and which means require periodic checking and adjustment, these prior devices do not provide constant operating force and constant torque on the clutch, regardless of wear.

Therefore, another aspect of the present invention is to provide a self-contained, mechanical clutch which utilizes Belleville-type springs as the resilient means for urging the actuating mechanism toward the clutch engaged position. The arrangement is such that the springs can be permanently pre-loaded in assembly to an extent where additional subsequent compression of the springs due to the action of the cams results in a substantially constant force, and consequently a constant torque on the clutch regardless of wear of the friction surfaces. Alternatively, the force desired may be variable in a known and pre-determined manner. In either event, the action of the springs and consequently the characteristics of clutch action are pre-determined, and the springs are actually "working" only in the general range where clutch engagement begins to or in fact does occur.

One result of this arrangement is a clutch wherein wear adjustment is not necessary, but instead the springs automatically compensate for wear on the friction linings.

The clutch provided by the present invention is so constructed and the parts thereof are so arranged that various spring rates for the clutch can be readily provided, and the Belleville springs can be permanently pre-loaded during assembly to an extent and so arranged that they do not further compress by axial movement of the cam members until all clutch disc clearance is taken up. Under certain circumstances where it is desirable, constant operating force and thereby constant clutch torque can be provided. That is to say, by permitting the Belleville springs to work only in that area of flatness of their load-deflection curve, a constant clutch torque is provided, regardless of and without attention to wear on the friction surfaces.

These and other objects and advantages of the present invention will appear hereinafter as this disclosure progresses, reference being had to the drawings accompanying and forming a part of this specification, in which:

FIGURE 1 is a side elevational view, partially in section, showing a clutch made in accordance with the present invention, and in the clutch disengaged position;

FIGURE 2 is a fragmentary, sectional view showing a modified form of drive transmitting elements, but employing the same actuating mechanism as shown in FIGURE 1, but in a clutch actuating position;

FIGURES 3 and 4 are views similar to FIGURE 2, and showing other modified forms of drive transmitting elements, but all employing the same actuating mechanisms as shown in FIGURE 1, in the disengaged position;

FIGURE 5 is an axial view of one of the cam members, the view being taken generally along the line 5—5 in FIGURE 1;

FIGURE 6 is a side view, in section, taken along line 6—6 in FIGURE 5;

FIGURE 7 is a fragmentary, sectional view taken generally along line 7—7 in FIGURE 5, but showing a portion of each of the cam members when in the disengaged position;

FIGURE 8 is a view similar to FIGURE 7, but showing the relative position of a portion of the cam members when the mechanism is in the clutch engaged position, and FIGURE 9 is one type of load-deflection curve for Belleville springs used with the present invention.

Referring in greater detail to the drawings, the integral and compact clutch includes a rotatable support 1 on which the various other parts of the clutch are supported. The support 1 has been shown as an externally splined sleeve having a keyway 2 by means of which it can be fixed for rotation with a shaft (not shown), and a set screw collar 3 having set screws 4 to secure the sleeve axially in place on the shaft. The support 1 could also be a shaft instead of a sleeve, but a sleeve lends itself for ready adaptation to a wide variety of applications and uses.

The actuating mechanism AM is the same for FIGURES 1 to 4 inclusive and is mounted for abutting relationship through a spacer 5 with the drive transmitting portion DT, DT2, DT3, and DT4 of FIGURES 1 to 4, respectively. Similar parts in these views have been similarly numbered.

Drive Transmitting Portions

The various drive transmitting portions are of the type in which one of their elements is axially shiftable to cause frictional engagement of the elements in any one of the modifications, as follows:

In FIGURE 1, the portion DT includes two sheave elements 10 and 11 which are mounted by their respective antifriction, radial-type, thrust bearing assemblies 12 and 13. A snap ring 14 holds the element 11 and its associated bearing assembly 13 from axial movement to the right, as viewed in FIGURE 1, and the inner race of bearing assembly 12 abuts against the actuating mechanism through the spacer 5. A friction disc 15 is located between the sheaves and has a splined driving connection with the externally splined support 1.

When the sheave 10 is urged toward sheave 11 sufficiently, the sheaves are brought into driving engagement with the support 1 through the disc element 15.

A pair of Belleville springs 16 and 17 act between their respective sheaves 10 and 11 and the disc element 15 to thereby positively and quickly release the driving engagement therebetween when the clutch is disengaged.

The drive transmitting portion DT2 of FIGURE 2 is of the type utilizing a single sheave 20 mounted on the support 1 by its bearing assembly 21. An axially shiftable element in the form of a friction plate element 22 is splined to the support 1 and is drivingly engageable with the sheave through its friction material 22a. FIGURE 2 shows the actuating mechanism in the clutch engaged position.

Belleville springs 24, 25 positively disengage the plate element 22 from the sheave 20 when the actuating mechanism AM is released, as will appear.

In FIGURE 3, a back-up plate 30, the axially shiftable pressure plate 31, and the friction discs 32 are all splined to the sheave support for rotation therewith. Friction discs 33 carried by the slots 34 in the driven cup 35 are drivingly engageable between the adjacent discs 32 in the known manner. Thus, the plate 31 constitutes the axially shiftable element in this modification.

FIGURE 4 shows another drive transmitting portion DT4 which includes a back-up plate 40, and the axially shiftable element in the form of pressure plate 41, both of which are drivingly splined to the support 1 and have friction material 40a and 41a, respectively, for driving engagement with opposite sides of a sprocket 42.

The sprocket is rotatably mounted on an antifriction, radial thrust bearing assembly 43 carried on support 1. Belleville springs 44 and 45 provide positive release of the friction surfaces from the sprocket at the appropriate time.

The above modifications of various drive transmitting elements of the clutch are by way of example only, and other forms are also contemplated for use with the present invention which should not be limited in its scope to any particular form of these elements. It will be noted that one of the elements is axially shiftable by the actuating mechanism (to be described) toward the other element to cause engagement of the clutch. The dirven elements such as the sheaves, sprocket, cup or the like may be axially shiftable or stationary as desired.

*Actuating Mechanism*

The actuating mechanism AM shown in FIGURES 1 to 4 includes a pair of cam members 50 and 51 which may be identical to one another as shown in the drawings and which are preferably formed as stampings from sheet steel. As shown clearly in FIGURES 6 and 7, these ring-like cam members each have a generally U-shaped cross section which includes an annular and axially disposed inner flange 52 and an outer flange 53. These flanges are connected by the intermediate and radially extending side 54.

A plurality of arcuate and elongated depressions 55 are pressed into the side 54 of each cam member, and these depressions are of progressively increasing depth along their length so as to form an inclined cam surface 56. When viewed axially, as in FIGURE 5, it will be noted that these depressions are arcuately formed as an arc having the axial center of the clutch as a center. As shown in FIGURE 6, these depressions are also of arcuate shape when viewed transversely to the clutch axis to thereby accurately accommodate a ball 57 and form a guide track therefor.

If it is desired to provide an "over-center" action in the clutch, then a hole 55a or depression would be formed in the shallow end of each cam track. When the balls enter their respective detents 55a, the clutch remains in the engaged position without requiring holding by the operator.

As indicated in FIGURE 7, when the mechanism is assembled the cam surfaces of one of the cam members are in general axial alignment with the cam surfaces of the other cam member. In addition, the deep end of the depressions of one cam member is located at the same end as the respective shallow end of the depressions of the other cam member.

One of the cam members may be anchored as, for example, by means of an arm 58 fixed thereto which may be secured to a stationary part (not shown) of the machine on which the clutch is used. The other cam member is adapted to be rotated slightly by oscillation of the arm 59 fixed thereto, to thereby cause engagement of the clutch, as shown in FIGURE 8. Alternatively, a push-pull cable and sheath (not shown) could be used to actuate the clutch, the cable being secured to one arm and the sheath to the other. In any event, relative rotative movement between the cam members causes clutch actuation.

FIGURE 7 shows the position of one of the pairs of cams when the mechanism is in the disengaged position, and FIGURE 8 shows the clutch engaged position. To engage the clutch, the cam members are rotated relative to one another which causes the balls 57 to ride to the shallow end of the tracks 56, thus urging the cam members apart in an axial direction. Thus, relative rotative movement of the cam members is through the full length of the cam tracks, resulting in a fixed and pre-determined amount of axial movement of the cams. The initial portion of this axial cam movement is utilized to take up the inherent clearance spacing in the clutch elements, and the last portion of axial movement of the cam member results in additional compression of the Belleville springs 70 and 71 beyond the initial loading of these springs.

The bearing assemblies 60 and 61 move axially with their respective cam members, and the actuating force is distributed evenly around the circumference of the members, and the balls move with rolling contact against each of their inclined cam surfaces.

The actuating force for operating the clutch is applied by a line of force which is normal to the clutch axis, and this causes rotation of one of the cam members, in the known manner. The result is a smoothly operating clutch having no shock loads on any of the parts or bearings.

In accordance with the present invention, each of the cam members 50 and 51 are individually mounted on their respective ball bearing assemblies 60 and 61. More specifically, the flanges 52 of the cam members fit tightly on the outer race of their respective bearing assemblies. The assemblies are in turn mounted on a rotatable support, such as sleeve 1, which forms part of the clutch. The bearing assemblies are also mounted for limited axial movemnt relative to one another and carry with them their respective cam members, as will now be described.

The cam members 50 and 51 are held on their respective antifriction, radial thrust type bearing assemblies 60 and 61 by the respective snap ring 62 and 63 located in the outer race of their bearing assemblies. The balls 57 prevent axial displacement of the cam members on their bearing assemblies in a direction toward one another. When the actuating mechanism is operated, the bearing assemblies are separated by sliding in opposite directions along the sleeve.

Attention is directed to the snap ring 64 which is axially secured to the support at a location between the inner races of the ball bearing assemblies 60 and 61. This ring forms a stop means for the bearing assembly 60 in the axial direction toward the assembly 61 and drive transmitting elements. That is to say, this stop means prevents axial displacement of bearing assembly 60 to the right, as viewed in FIGURE 1, that is, it permits only limited movement of cam member 60 toward the other member 61 due to the influence of the resilient means to be presently described. Bearing assembly 61 does not abut against snap ring 64 but does abut against the spacer 5 to move its axially against the drive transmitting portions of the clutch.

Resilient means are provided for biasing the bearing member 60 against the snap ring 64 when the clutch is disengaged, as shown in FIGURE 1, and for biasing the entire actuating mechanism AM against the drive transmitting elements when the cam members are separated by relative rotation therebetween, as shown in FIGURE 2. This resilient means comprises a pair of large Belleville springs 70 and 71 which are oppositely disposed and act between the snap ring 72 fixed on support 1 and the bearing assembly 60.

When the clutch is engaged by rotative movement of one of the cam members, as shown in FIGURE 2, the general direction of the forces in the actuating mechanism is as indicated generally by the two arrows in FIGURE 2.

The Belleville springs are of the high capacity, precision disc type which can be chosen for various spring rates. These springs are so assembled in the clutch and pre-loaded to an extent whereby they do not compress in their desired range until the bearing assemblies 60 and 61 are sufficiently separated in an axial direction to take up all the clearance between the clutch elements.

After this occurs, additional compression of the springs by actuation of one of the cam members results in a constant force, if Belleville springs of the type having a flat curve characteristic as shown in FIGURE 9 are utilized. Therefore, the result is constant torque on the clutch regardless of wear on the various parts, such as friction linings.

In summary, the Belleville springs 70 and 71 are pre-loaded and act to hold the assembly 60 against the snap ring 64 when the actuating mechanism is in the clutch released position. In other words, in assembling the unit, the bearing 60 is pressed tightly against snap ring 64, and the springs 70 and 71 must be compressed a given amount in order to be able to place the snap ring 72 in its groove. Thus, the amount of spring compression can be changed for springs having different characteristics by changing the distance between the snap rings 64 and 72.

Additional compression or loading of these springs by actuation of the cams causes them to actually "work" or compress only in the relatively flat range R of their load-deflection curve, as shown in FIGURE 9. The pre-load deflection portion PLD of the curve is undesirably steep, and these particular springs do not "work" in this range.

The proper selection of an $h/t$ ratio of these springs provides a constant force which, as applied in the present invention, results in a constant torque clutch. An $h/t$ ratio (which is the ratio of the cone height of the spring to the thickness of the metal making up the spring) of from about 1.4 to 1.6 has been found satisfactory.

The above arrangement provides a compact clutch particularly in an axial direction and one which requires no wear adjustment, but instead automatically compensates for wear. The Belleville springs can be pre-loaded to permit the clutch to provide constant torque throughout its capacity range. This pre-loading reduces the amount of axial movement necessary by the cam members and consequently results in cam tracks of shorter and less steep inclines, thereby resulting in a clutch having a shorter actuating stroke and generally more efficient. Stated otherwise, the amount of cam rise necessary is only that required to take up clearance in the clutch elements and also the wear allowance desired.

Springs having other known characteristics can also be used, and in either case the action of the clutch throughout its working range can be accurately predicted and controlled.

Various modes of carrying out the invention are contemplated as being within the scope of the following claims particularly pointing out and distinctly claiming the subject matter which is regarded as the invention.

I claim:

1. A self-contained, mechanically operated clutch comprising, a rotatable sleeve, a pair of drive transmitting elements mounted on said sleeve, one of said elements being secured to said sleeve for rotation therewith but axially movable relative to the other element to thereby effect driving engagement therebetween, a pair of antifriction, ball bearing assemblies mounted on said sleeve, one of said assemblies abutable against said one element for axially moving the latter, a cam member mounted on each of said assemblies for rotative movement with respect to one another and having cam surfaces forming pairs of complementary and oppositely facing cam surfaces, a ball between and in engagement with each pair of oppositely facing cam surfaces whereby rotation of one member causes the balls to ride along their respective surfaces and separate said members and axially shift said one element, stop means axially secured on said sleeve and located between said assemblies, and Belleville spring means mounted on said sleeve and urging one of said assemblies against said stop means when said clutch is disengaged, said spring means resiliently biasing both said assemblies toward the drive transmitting elements when said cam members are separated to cause clutch engagement.

2. A self-contained, mechanically operated clutch comprising, a rotatable sleeve, a pair of drive transmitting elements mounted on said sleeve, one of said elements being secured to said sleeve for rotation therewith but axially movable relative to the other element to thereby effect driving engagement therebetween; actuating mechanism mounted on said sleeve and abutable against said one element for axially moving the latter, said mechanism comprising a pair of antifriction, ball bearing assemblies mounted on said sleeve, a cam member mounted on each of said assemblies for rotative movement with respect to one another and having cam surfaces forming pairs of complementary and oppositely facing cam surfaces, a ball between and in engagement with each pair of oppositely facing cam surfaces whereby rotation of one member causes the balls to ride along their respective surfaces and separate said members and cause axial shifting of said one element, Belleville spring means mounted on said sleeve and acting against said bearing assemblies to move them axially and thereby move said one element axially to effect said driving engagement, said spring means acting to carry the axial clamping thrust of the elements, and stop means axially stationary on said sleeve, said spring means reacting against said stop means when the clutch is disengaged to thereby permit pre-loading of said spring means.

3. A self-contained, mechanically operated clutch comprising, a rotatable sleeve, a pair of drive transmitting elements mounted on said sleeve, one of said elements being secured to said sleeve for rotation therewith but axially movable relative to the other element to thereby effect driving engagement therebetween, a pair of antifriction, ball bearing assemblies mounted on said sleeve, one assembly being located adjacent to and abutable against said one element for axially moving the latter, Belleville spring means mounted on said sleeve adjacent to said other assembly and at the side thereof opposite to said one assembly, said spring means acting between said sleeve and said other assembly to urge the latter axially toward said one assembly and said elements, stop means axially secured on said sleeve and located between said assemblies, said other assembly abutable against said stop means and thereby limited in its axial movement toward said one assembly due to influence of said spring means, whereby the latter can be pre-loaded and hold said other assembly against said stop means when the clutch is disengaged, a cam member mounted on each of said assemblies for rotative movement with respect to one another and having cam surfaces forming pairs of complementary and oppositely facing cam surfaces, and a ball between and in engagement with each pair of oppositely facing cam surfaces whereby rotation of one member causes the balls to ride along their respective surfaces and separate said members and the assemblies and thereby axially shift said one element to cause clutch engagement.

4. A self-contained, mechanically operated clutch comprising, a rotatable support, a pair of drive transmitting elements mounted on said support, one of said elements being secured to said support for rotation therewith but axially movable relative to the other element to thereby effect driving engagement therebetween, a pair of anti-friction, ball bearing assemblies mounted on said support, one assembly being located adjacent to and abutable against said one element for axially moving the latter, Belleville spring means mounted on said support adjacent to said other assembly and at the side thereof opposite to said one assembly, said spring means acting between said support and said other assembly to urge the latter axially toward said one assembly and said elements, stop means axially secured on said support and located between said assemblies, said other assembly abutable against said stop means and thereby limited in its axial movement toward said one assembly due to influence of said spring means, whereby the latter can be pre-loaded and hold said other assembly against said stop means when the clutch is disengaged, a cam member mounted on each of said assemblies for rotative movement with respect to one another to thereby cause axial separation of said cam members and the assemblies and thereby axially shift said one element to cause clutch engagement.

5. A self-contained, mechanically operated clutch comprising, a rotatable support, drive transmitting means mounted on said support and axially movable to thereby effect clutch engagement, a pair of antifriction, ball bearing assemblies mounted on said support, one assembly being located adjacent to and abutable against said drive transmitting means for axially moving the latter, Belleville spring means mounted on said support adjacent to said other assembly and at the side thereof opposite to said one assembly, said spring means acting between said support and said other assembly to urge the latter axially toward said one assembly and said drive transmitting means, stop means axially secured on said support and located between said assemblies, said other assembly abutable against said stop means and thereby limited in its axial movement toward said one assembly due to influence of said spring means, whereby the latter can be pre-loaded and hold said other assembly against said stop means when the clutch is disengaged, a cam member fixed to each of said assemblies for rotative movement with respect to one another to thereby cause axial separation of said assemblies and consequent axial shifting of said drive transmitting means for clutch engagement.

6. A self-contained, mechanically operated clutch comprising, a rotatable support, drive transmitting means mounted on said support and axially movable to thereby effect clutch engagement, a pair of anti-friction bearing means mounted on said support for relative axial movement between said bearing means to shift said drive transmitting means, a cam member mounted on each bearing means for rotative movement with respect to one another to thereby cause axial separation of said cam members and their associated bearing means and consequently axial shifting of said drive transmitting means, stop means axially secured on said support and located between said anti-friction bearing means, and Belleville spring means on said support for urging said bearing means and their associated cam members axially toward said drive transmitting means.

7. A self-contained, mechanically operated clutch comprising, a rotatable support, drive transmitting means mounted on said support and axially movable to thereby effect clutch engagement, a pair of antifriction bearing means mounted on said support for relative axial movement between said bearing means to shift said drive transmitting means, a cam member mounted on each bearing means for rotative movement with respect to one another to thereby cause axial separation of said cam members and their associated bearing means and consequently axial shifting of said drive transmitting means, axially stationary stop means on said support, and Belleville spring means on said support and reacting against said stop means when the clutch is disengaged to thereby permit pre-loading of said spring means, said spring means also acting to urge said bearing means and their associated cam members axially toward said drive transmitting means to effect clutch engagement.

References Cited in the file of this patent

UNITED STATES PATENTS

| | | |
|---|---|---|
| 787,072 | Brush | Apr. 11, 1905 |
| 2,813,609 | Spencer | Nov. 19, 1957 |
| 2,856,048 | Carlson | Oct. 14, 1958 |
| 2,931,476 | Zeidler et al. | Apr. 5, 1960 |
| 2,937,729 | Sperr | May 24, 1960 |
| 3,000,479 | Mosbacher | Sept. 19, 1961 |